(12) United States Patent
Carney et al.

(10) Patent No.: US 8,825,223 B2
(45) Date of Patent: Sep. 2, 2014

(54) HASHED STRINGS FOR MACHINE-TO-MACHINE COMMUNICATION BASED ON TIME AND SECRET STRINGS

(75) Inventors: Mark Douglas Carney, Sterling, VA (US); Jonathan McCown, Dillsburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 13/396,004

(22) Filed: Feb. 14, 2012

(65) Prior Publication Data

US 2013/0211622 A1   Aug. 15, 2013

(51) Int. Cl.
  *G05D 1/00*   (2006.01)
  *H04L 9/00*   (2006.01)
  *H04L 9/32*   (2006.01)

(52) U.S. Cl.
  CPC ........... *H04L 9/3239* (2013.01); *H04L 2209/84* (2013.01)
  USPC ............................................. 701/2; 713/150

(58) Field of Classification Search
  CPC .... H04L 9/3239; H04L 2209/84; G06F 13/14
  USPC ................. 701/2; 713/50; 340/426.12, 425.5, 340/426.28, 5.31, 5.64, 988; 180/167.7; 342/70; 705/14.51; 455/12.1; 726/26–30
  See application file for complete search history.

(56) References Cited

U.S. PATENT DOCUMENTS

| | | | |
|---|---|---|---|
| 6,124,805 A * | 9/2000 | Gabbard | 340/426.12 |
| 6,615,186 B1 * | 9/2003 | Kolls | 705/14.51 |
| 2007/0288127 A1 * | 12/2007 | Haq et al. | 701/2 |
| 2008/0033740 A1 * | 2/2008 | Cahn et al. | 705/1 |
| 2010/0122082 A1 * | 5/2010 | Deng et al. | 713/159 |
| 2012/0219272 A1 * | 8/2012 | Eto et al. | 386/286 |
| 2013/0198510 A1 * | 8/2013 | Rahman et al. | 713/155 |

* cited by examiner

*Primary Examiner* — Marthe Marc-Coleman

(57) ABSTRACT

Methods, devices, and storage media provide for receiving a request to invoke a machine-to-machine communication to permit remote control of a device, wherein the request includes a device string that identifies the device and one or more secret strings; generating one or more hashed strings based on the request and a current time; and transmitting a remote control request to the device, wherein the remote control request includes the one or more hashed strings and the one or more secret strings.

21 Claims, 12 Drawing Sheets

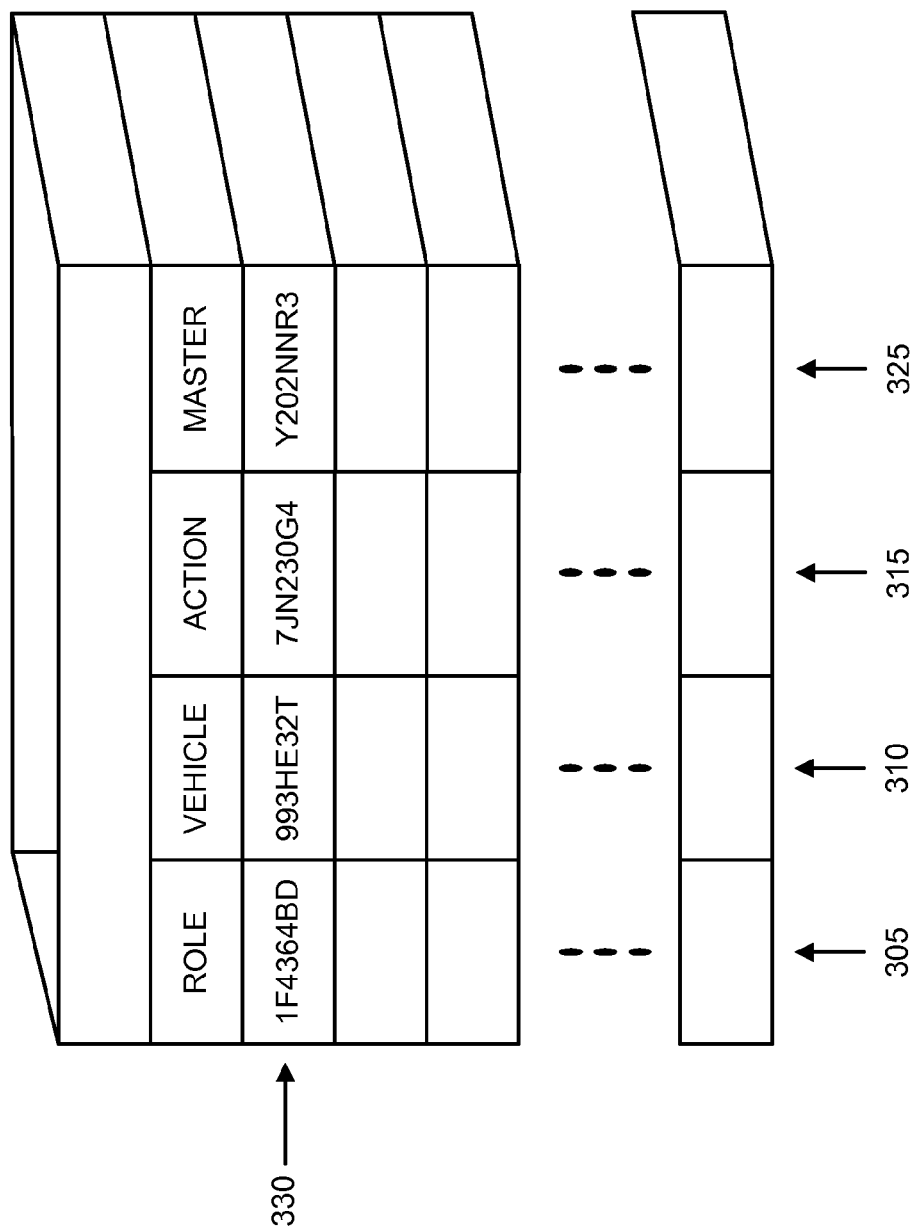

HASHED STRINGS FOR MACHINE-TO-MACHINE COMMUNICATION BASED ON TIME AND SECRET STRINGS

BACKGROUND

Machine-to-machine (M2M) communication has expanded to a variety of applications, such as utilities, vending machines, point of sales terminals, transport and logistics, healthcare, security, financial services, etc. Secure machine-to-machine communication is always a concern, particularly if the machine-to-machine communication involves remotely controlling a machine-to-machine end device.

BRIEF SUMMARY OF THE INVENTION

According to an exemplary embodiment, a network system provides machine-to-machine communication services. The machine-to-machine services include a service to permit remote control of a device. For example, according to an application of machine-to-machine communication, such as in a vehicular management system, the network system permits remote control of a vehicle, such as unlocking doors, disabling the vehicle, activating the horn and/or lights (e.g., to assist a user in locating his/her vehicle), performing diagnostic testing, etc.

According to an exemplary embodiment, the network system uses a hash algorithm to generate hashed strings. The machine-to-machine communication provides remote control of a device based on these hashed strings. According to an exemplary embodiment, the hashed strings include a hashed, time-based string, a hashed, shared secret string, and one or multiple other hashed, secret strings. According to an exemplary embodiment, the hashed, secret string pertains to an action to be performed by a device (e.g., a remote controlled device) or performed collaboratively by the device and one or multiple other devices. According to another exemplary embodiment, the hashed, secret string pertains to a role of a user associated with a device (e.g., a remote controlling device) or a role of the device. According to yet another embodiment, the network system uses both a hashed, secret action string and a hashed, secret role string. According to an exemplary implementation, the network system truncates a hashed string (e.g., to a particular number of bits or bytes). According to another exemplary implementation, the network system does not truncate a hashed string.

DESCRIPTION OF THE DRAWINGS

FIGS. 3A-3D are diagrams illustrating exemplary data or information stored in databases or data structures;

DETAILED DESCRIPTION

The following detailed description refers to the accompanying drawings. The same reference numbers in different drawings may identify the same or similar elements. Also, the following detailed description does not limit the invention.

The term machine-to-machine communication, as used herein, includes communication between two or more devices. Machine-to-machine communication is also known as and incorporates device-to-device (D2D) communication and/or telemetry. A machine-to-machine communication may occur via a wireless connection and/or a wired connection.

The term string, as used herein, includes one or multiple characters. For example, a character may include a number, a letter, or a value representing another type of symbol.

While implementations of exemplary embodiments described herein are described using a particular protocol, communication standard, hashing algorithm, application of machine-to-machine communication (e.g., remote control), etc., such implementations of the embodiments are not intended to be restrictive nor provide an exhaustive treatment, as such. In other words, the exemplary embodiments described herein may be implemented using other suitable protocols, communication standards, hashing algorithms, applications of machine-to-machine communication, etc., that may not be specifically described herein.

Figure 1:
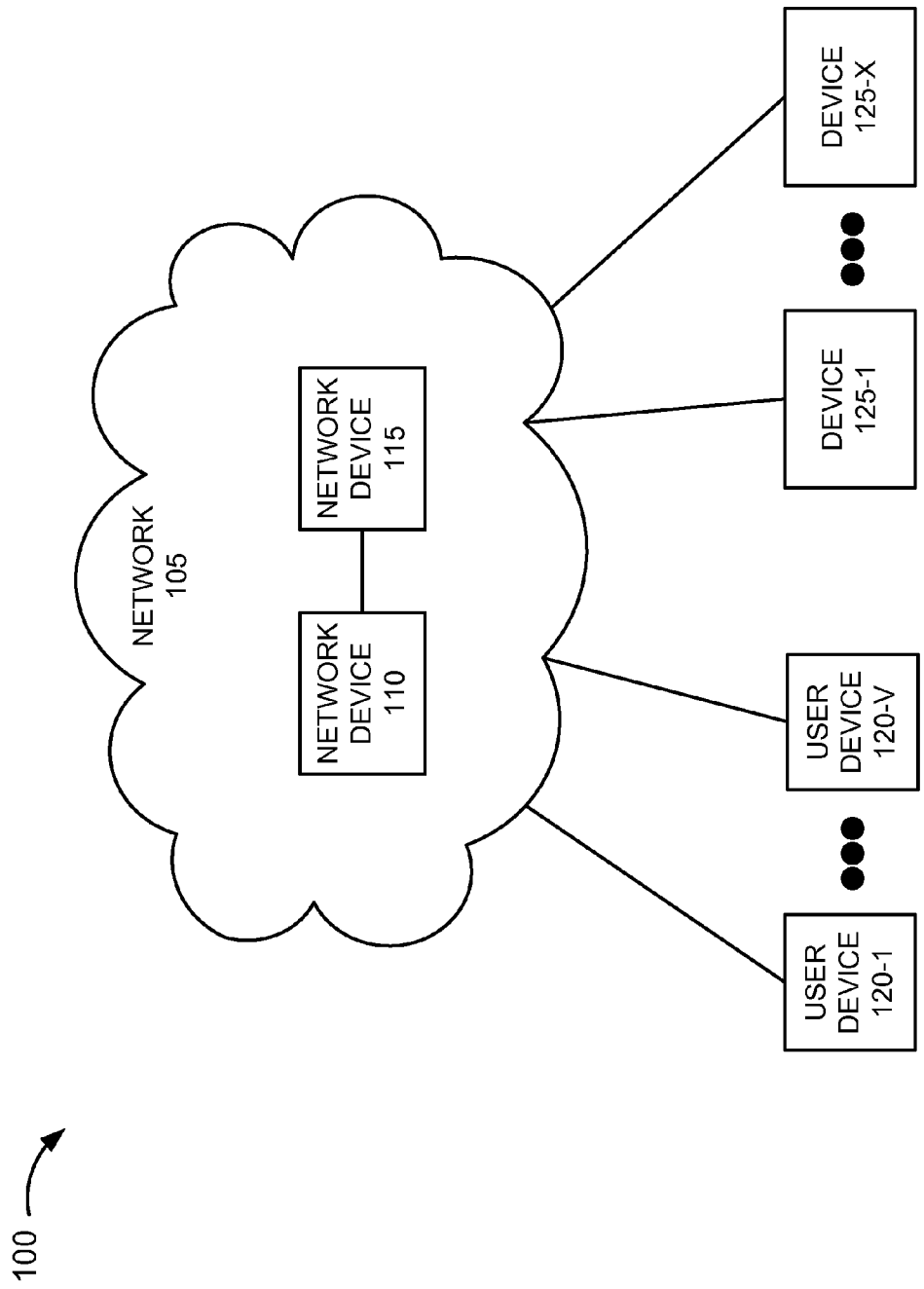
FIG. 1 is a diagram illustrating an exemplary environment in which an exemplary embodiment of machine-to-machine communication may be implemented.

FIG. 1 is a diagram illustrating an exemplary environment in which an exemplary embodiment of machine-to-machine communication may be implemented. As illustrated, environment 100 includes a network 105 that includes a network device 110 and a network device 115. Environment 100 also includes user devices 120-1 through 120-V, in which V>1 (also referred to collectively as user devices 120 or individually as user device 120) and devices 125-1 through 125-X, in which X>1 (also referred to collectively as devices 125 or individually as device 125).

The number of devices and the configuration in environment 100 are exemplary and provided for simplicity. According to other embodiments, environment 100 may include additional devices, fewer devices, different devices, and/or differently arranged devices, than those illustrated in FIG. 1. For example, according to other embodiments, a single device in FIG. 1 may be implemented as multiple devices. For example, network device 110 may be implemented as multiple devices. Additionally, or alternatively, according to even other embodiments, multiple devices may be implemented as a single device. For example, network device 110 and network device 115 may be implemented as a single device, and/or user device 120 and device 125 may be implemented as a single device.

A device may be implemented according to a centralized computing architecture, a distributed computing architecture, or a cloud computing architecture. Additionally, a device may be implemented according to one or multiple network architectures (e.g., a client device, a server device, a peer device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and involve intermediary device(s) and/or network(s) not illustrated in FIG. 1.

Network 105 includes a network that provides the machine-to-machine communication services described herein. Network 105 may include one or multiple networks. For example, network 105 may be implemented as the Internet, a private network, a public network, a wide area network (WAN), a metropolitan network (MAN), a wireless network, an Internet Protocol (IP) network, a data network, various combinations thereof, etc.

Network device 110 includes a network device that receives machine-to-machine service requests, processes the machine-to-machine service requests, and transmits machine-to-machine service responses. Network device 110 may be implemented as a computational device (e.g., a computer, etc.), a network device that hosts server software (e.g., a Web server device, an application server device, etc.), or other suitable network device (e.g., a database management device, etc.). Network device 110 is described further below.

Network device 115 includes a network device that generates hashed strings based on data or information included in machine-to-machine service requests. Network device 115 stores one or multiple hashing algorithms (also known as hashing functions), such as MD5, Secure Hashing Algorithm (SHA)-1, SHA-2, SHA-X (e.g., in which X=256, 384, 512, etc.) and/or other well-known hashing algorithms. Additionally, network device 115 may apply a hashing algorithm to various combinations of strings (e.g., variables or arguments), such as the time-based string, the shared secret string, and one or multiple secret-based strings. Network device 115 is described further below.

User device 120 includes a device having communicative capabilities. User device 120 may be implemented as a mobile device, a portable device, or a stationary device. For example, user device 120 may be implemented as a computer (e.g., a desktop computer, a handheld computer, a laptop computer, etc.), a telephone, (e.g., a smartphone, a cellphone, a landline telephone, etc.), a communicative device of a vehicle, or other types of devices applicable to machine-to-machine communication.

Device 125 includes a device having communicative capabilities. According to an exemplary embodiment, device 125 is capable of being remotely controlled. According to an exemplary embodiment, as illustrated in FIG. 1, user device 120 and device 125 are separate devices. According to another exemplary embodiment, user device 120 and device 125 are the same device. For example, a communicative device of a vehicle may invoke machine-to-machine services and then be remotely controlled. Device 125 may be any type of device applicable to machine-to-machine communication.

FIGS. 2A-2D are diagrams illustrating an exemplary scenario in which machine-to-machine communication may be implemented in the environment depicted in FIG. 1. The description of messages and their content, number of, etc., are exemplary. According to other implementations, a message may include different data and/or information, multiple messages may be transmitted, received, etc. Additionally, any communication between devices may include various security measures, such as authentication, authorization, non-repudiation, data integrity, etc.

Figure 2A:
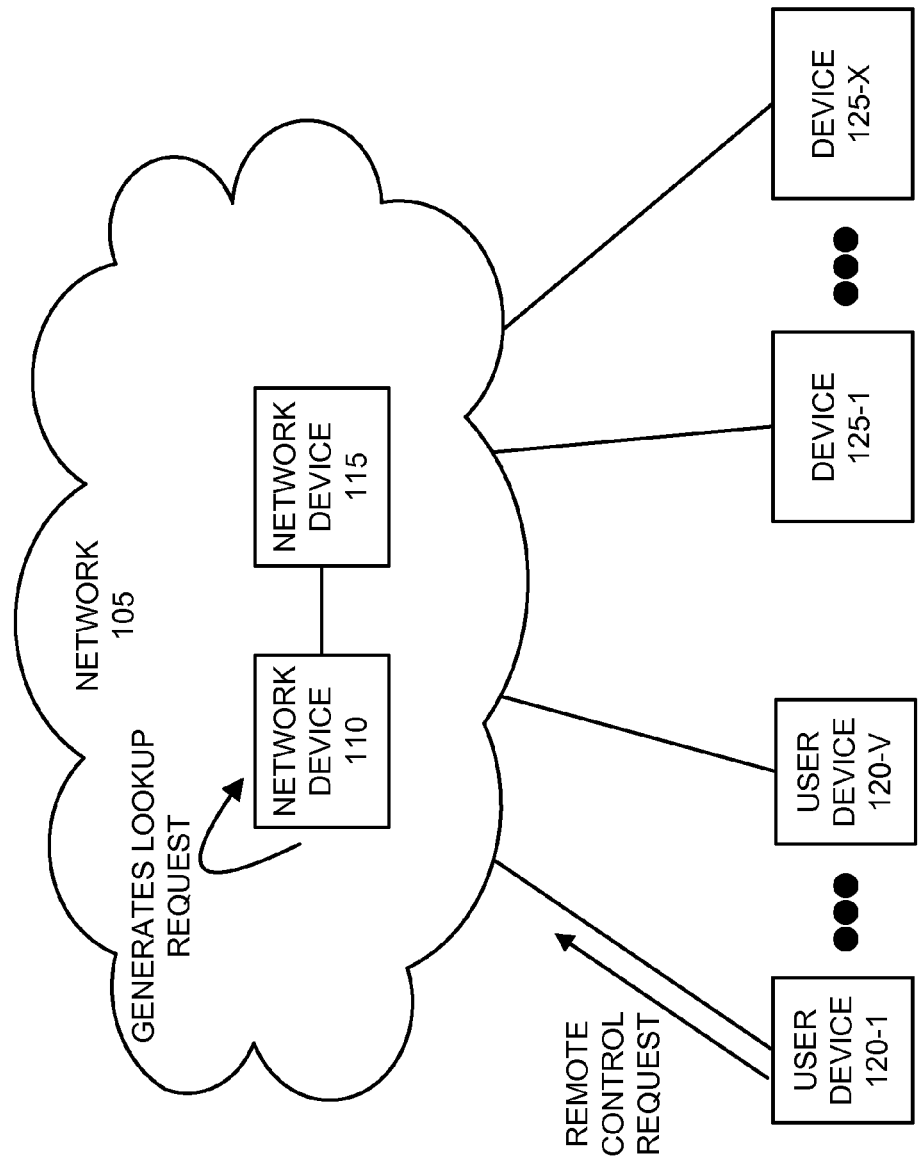
FIGS. 2A-2D are diagrams illustrating an exemplary scenario in which machine-to-machine communication may be implemented in the environment depicted in FIG. 1.

According to this scenario, assume that a user (not illustrated) is locked out of his/her car (e.g., illustrated as device 125-X). Referring to FIG. 2A, the user, via user device 120-1 (e.g., a smartphone), transmits a remote control request to network device 110. For example, user device 120-1 includes software, such as a mobile application, a web browser, etc., that permits the user to invoke the machine-to-machine services described herein. According to another implementation, the user may call a service center, and a service center representative may transmit, via a device (e.g., a computer), the remote control request to network device 110. As an example, the remote control request may be implemented as a Simple Object Access Protocol (SOAP) message.

The remote control request includes one or multiple strings. For example, as described further below, the remote control request may include a vehicle string and an action string. The vehicle string and the action string may be implemented as a single string or multiple strings (e.g., separate strings). Additionally, other messages described may be implemented in a similar manner.

According to this example, the remote control request includes a vehicle string (e.g., a vehicular identifier, a Vehicle Identification Number (VIN), etc.) that identifies the car and an action string (e.g., to unlock doors) to indicate an action to be performed. According to another exemplary implementation, the remote control request also includes a role string. For example, according to this scenario, the role string may pertain to the user and may indicate that the user is the owner of the car and/or a driver of the car.

There are various methods in which a string may be generated or obtained. For example, if user device 120-1 is the user's smartphone, the user may obtain a vehicular identifier and/or other data/information based on a pairing between user device 120-1 and the car (e.g., the car includes a vehicular management system). Additionally, or alternatively, the user may scan, via user device 120-1, vehicle information into his/her smartphone, such as, a bar code, numbers, letters, etc., that are displayed on a sticker near a car door, etc. Additionally, or alternatively, a string may be previously stored by user device 120-1. Additionally, or alternatively, a string may be generated or obtained in response to user selections or inputs via the software (e.g., mobile application, browser, etc.).

As further illustrated in FIG. 2A, in response to receiving the remote control request, network device 110 generates a lookup request to be transmitted to network device 115. The lookup request permits network device 110 to obtain string(s) (e.g., code(s) or value(s)) and remotely control device 125-X (e.g., the user's car) via machine-to-machine communication.

According to an exemplary embodiment, the lookup request includes the string(s) included in the remote control request. For example, the lookup request includes the vehicle string and the action string, or the vehicle string, the action string, and the role string.

According to another exemplary embodiment, network device 110 may generate substitute string(s) based on the string(s) included in the remote control request. For example, a substitute string may include data and/or information pertaining to the car and the action, or the car, the action, and the user (e.g., a role). The substitute string may be generated based on a hashing algorithm or other well-known methods.

Figure 2B:
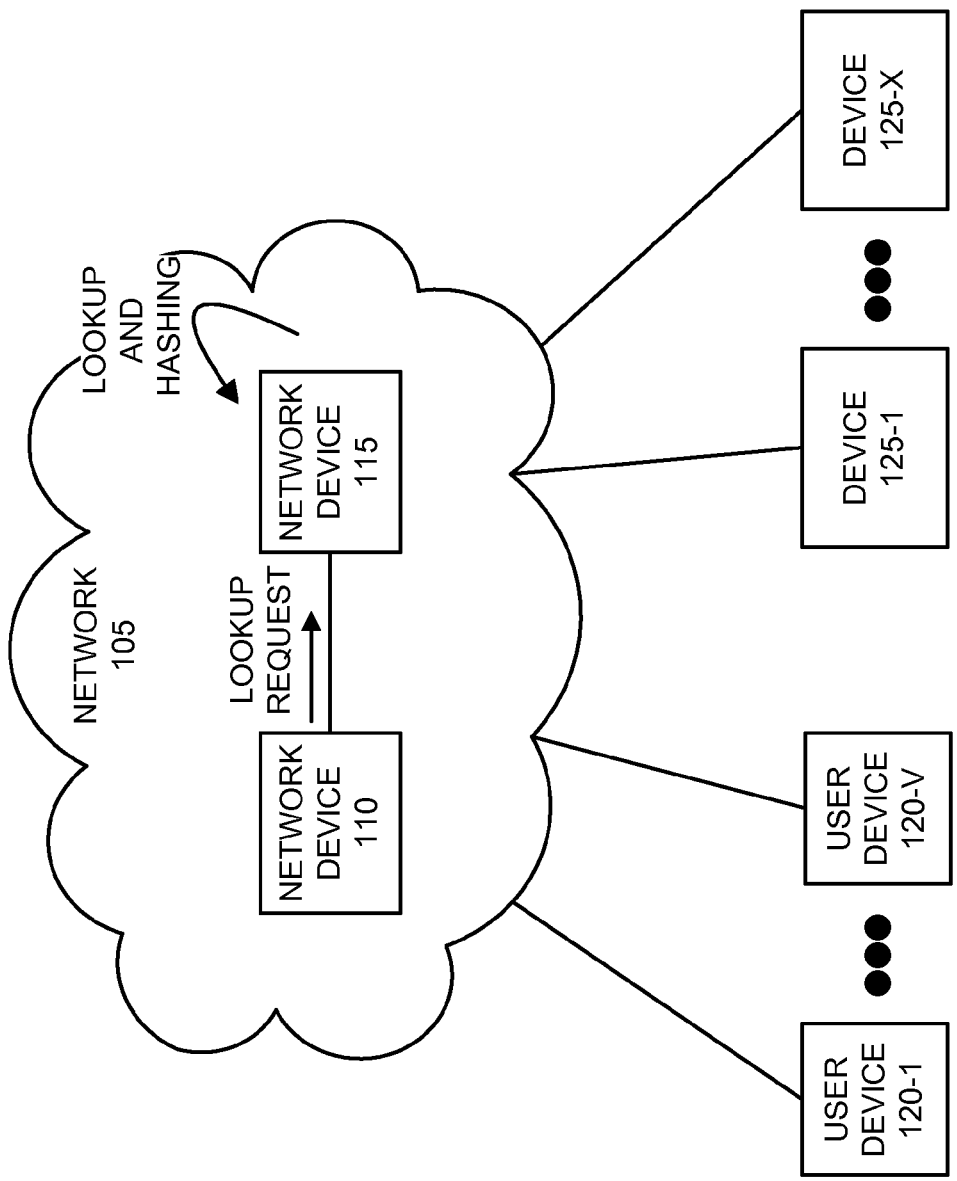

Referring to FIG. 2B, network device 110 transmits the lookup request to network device 115. In response to receiving the lookup request, network device 115 performs a lookup and hashing process. For example, network device 110 may use one or multiple databases or data structures that store(s) secret strings, which may include shared secret strings. The secret strings include vehicle strings, action strings, role strings, and master strings. Exemplary databases or data structures are described below.

FIGS. 3A-3D are diagrams illustrating exemplary strings stored in databases or data structures. According to these examples, the strings pertain to remotely controlling a vehicle. The lengths and values of the strings illustrated in FIGS. 3A-3D are exemplary.

Figure 3A:
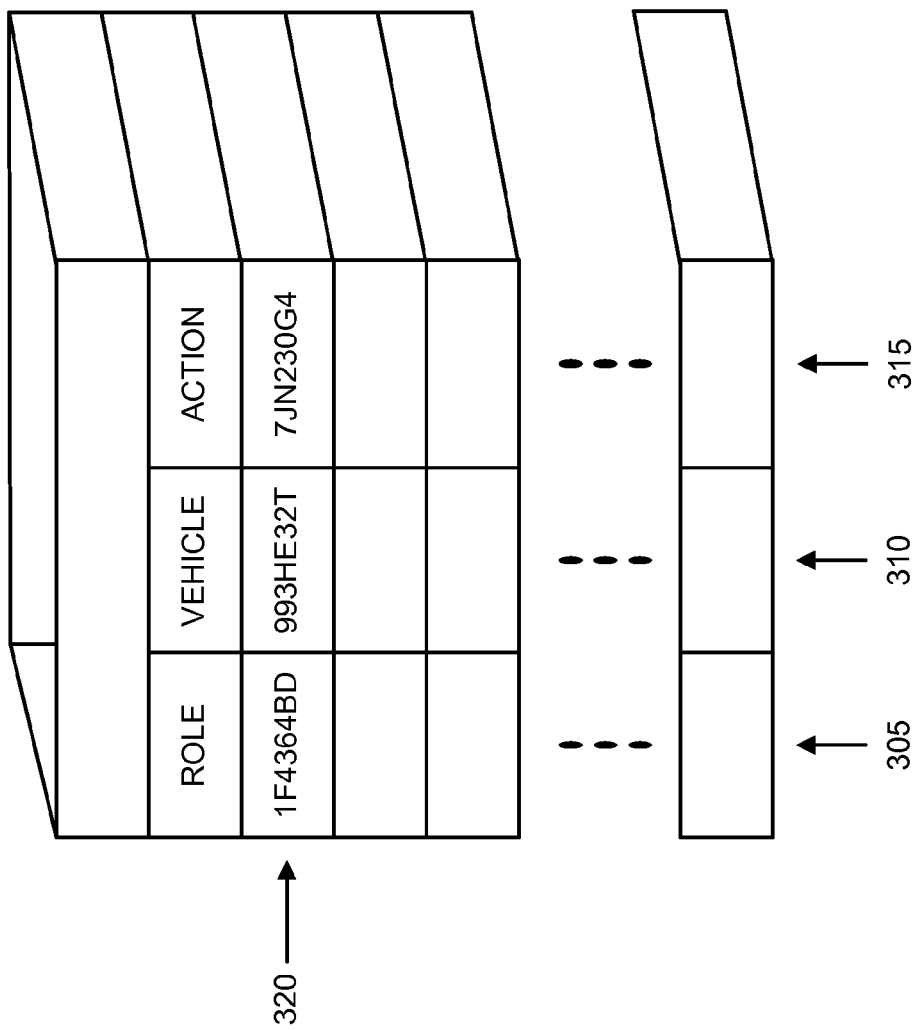

Referring to FIG. 3A, an exemplary database or data structure includes a role field 305, a vehicle field 310, and an action field 315. Role field 305 includes a string indicating a user. For example, the user may be an individual, such as a service representative, an administrator, a customer (e.g., an owner of a vehicle, a driver of a vehicle, etc.), or a group of individuals (e.g., a family, etc.) using the machine-to-machine service. Vehicle field 310 includes a string indicating a vehicle. For example, the string may identify a particular vehicle (e.g., a VIN, etc.) or a class of vehicle (e.g., a make, a model, a year, a combination thereof, etc.). Action field 315 includes a string indicating an action, an operation, or a process. For example, the string may indicate to unlock the door(s), generate a vehicle status report, disable the engine, perform a diagnostic, a combination thereof, or other well-known actions. As further illustrated in FIG. 3A, an entry 320 provides a mapping between role field 305, vehicle field 310, and action field 315.

Referring to FIG. 3B, an exemplary database or data structure includes role field 305, vehicle field 310, action field 315, and a master field 325. Master field 325 includes a string that indicates a master role. For example, a master role string may provide permission to perform various actions associated with multiple roles. By way of example, an owner of the vehicle may invoke a master role to allow the owner to perform any action pertaining to his/her vehicle. As further illustrated in FIG. 3B, an entry 330 provides a mapping between role field 305, vehicle field 310, action field 315, and master field 325.

Figure 3C:
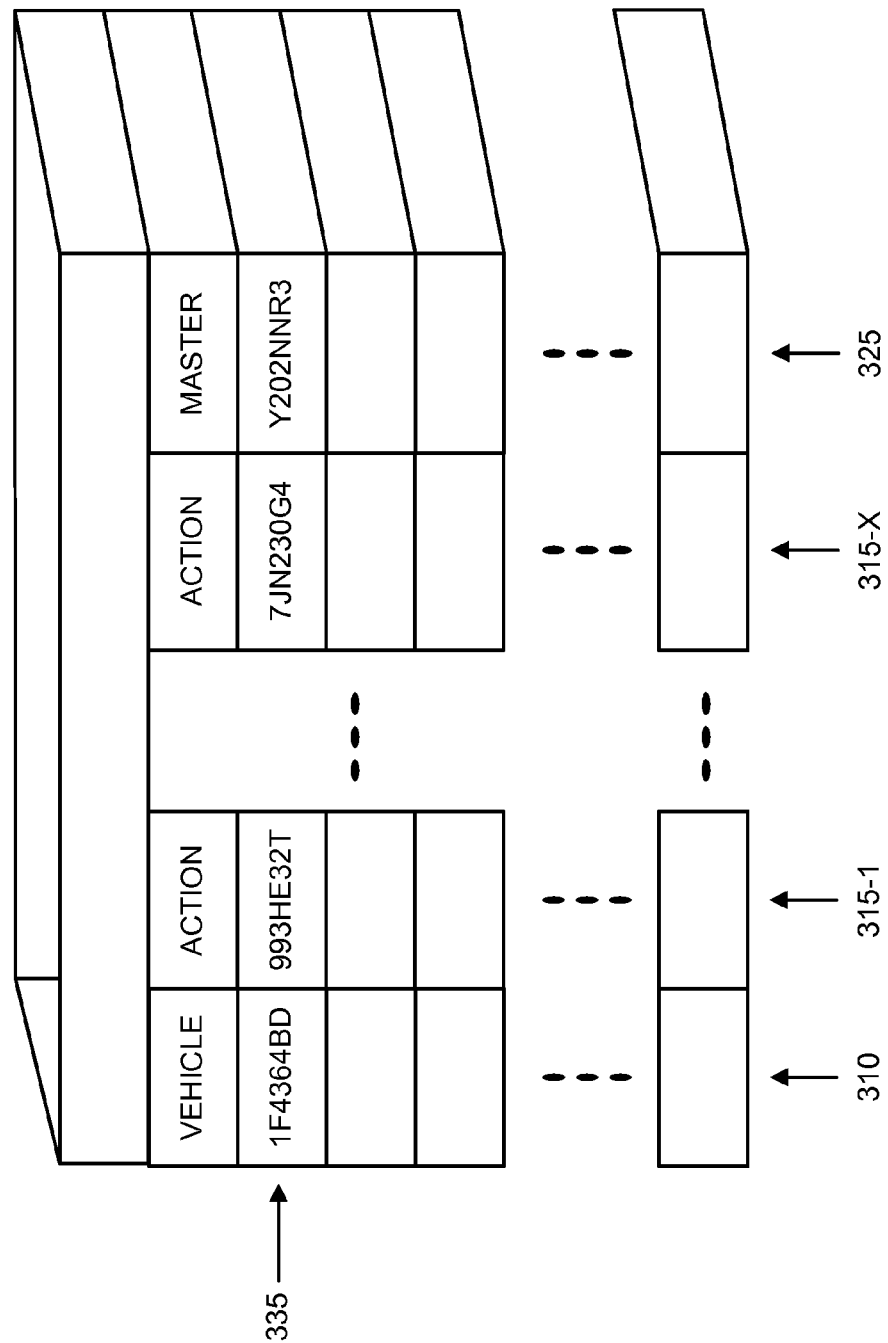

Referring to FIG. 3C, an exemplary database or data structure includes vehicle field 310, action fields 315-1 through 315-X, in which X>1, (also referred to collectively as action fields 315) and master field 325. According to this example, the database or data structure may be implemented to store action strings on a per-vehicle basis or action strings pertaining to a class of vehicles. As further illustrated in FIG. 3C, an entry 335 provides a mapping between vehicle field 310, action fields 315, and master field 325.

Figure 3D:
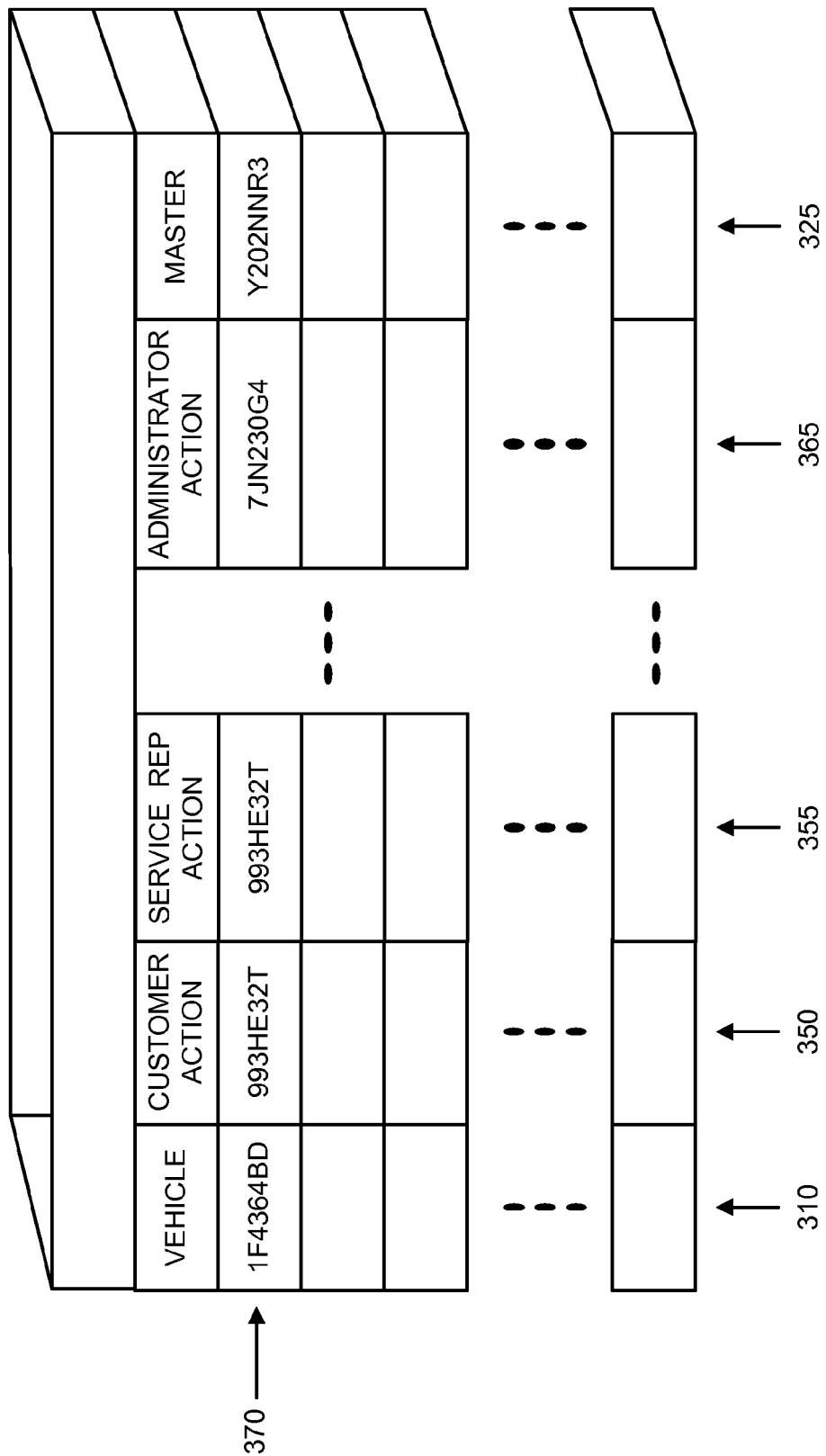

Referring to FIG. 3D, an exemplary role-based access control database or data structure is illustrated. In this example, the database or the data structure includes vehicle field 310, master field 325, and various types of role-to-action fields, such as a customer action field 350, a service representative action field 355, and an administrator action field 365. For example, customer action field 350 includes strings indicating actions that may be invoked by a customer. Similarly, service representative action field 355 and administrator action field 365 include strings indicating actions that may be invoked by a service representative or an administrator, respectively. As further illustrated in FIG. 3D, an entry 370 provides a mapping between vehicle field 310, customer action field 350, service representative action field 355, administrator action field 365, and master field 325.

According to other embodiments, the databases or the data structures may include additional, fewer, and/or different data and/or informational fields. For example, for devices other than a vehicle, vehicle field 310 may be considered more generically as a device field that stores a string that identifies a device. For example, a device identifier may be implemented as a network address (e.g., a Media Access Control (MAC) address, an Internet Protocol (IP) address, etc.) an equipment identifier, or other suitable identifier that is unique to the device or that identifies a class or a kind of a device.

Referring back to FIG. 2B and further to the exemplary scenario in which network device 115 performs a lookup process, it may be assumed that network device 115 selects an entry from a database or a data structure that matches or correlates to the vehicle string and the action string included in the lookup request. Alternatively, when the lookup request also includes a role string, network device 115 selects an appropriate entry.

As previously described, according to an exemplary embodiment, network device 115 applies a hashing algorithm to variables or arguments to generate hashed strings (e.g., codes or values). According to this example, in which the application of machine-to-machine communication pertains to remotely controlling a device (e.g., a car), network device 115 may use one or multiple types of expressions to generate a hashed string.

According to an exemplary embodiment in which remote control of the device pertains to a vehicle, network device 115 may use one or multiple exemplary expressions for calculating one or multiple hashed strings, such as: H (T, V, A); H (T, V, R); H (T, V, R, A); H (A, H (T, V)); H (R, H (T, V)); H (T, H (V, A)); H (T, H (V, R)), H (T, H (V, R, A)), etc. That is, for example, various combinations of the variables H, T, V and, A and/or R may be used. According to these exemplary expressions, H represents a hashing algorithm, T represents a time modulus (e.g., 30 seconds, 60 seconds, etc., relative to a current time), V represents an identifier pertaining to a vehicle (e.g., a vehicle string), A represents an action, an operation, a process, or a command (e.g., an action string), and R represents a role (e.g., a role string). According to an exemplary implementation in which network device 115 may select from multiple hashing methods (e.g., expressions), network device 115 may select an expression based on the strings received in the lookup request, the current time, and/or some other parameter (e.g., previous expression used; a random selection, etc.). Additionally, given the use of a time modulus T, devices in environment 100 may agree on a current epoch time and permissible drift.

Continuing with the scenario, assume network device 115 selects the expression H (T, V, A) or H (T, V, R, A), which includes a role string. For example, the lookup request may include a role string. Alternatively, in the event the lookup request does not include a role string, network device 115 may select the lowest possible role (e.g., in terms of authority) capable of invoking the action requested.

Figure 2C:
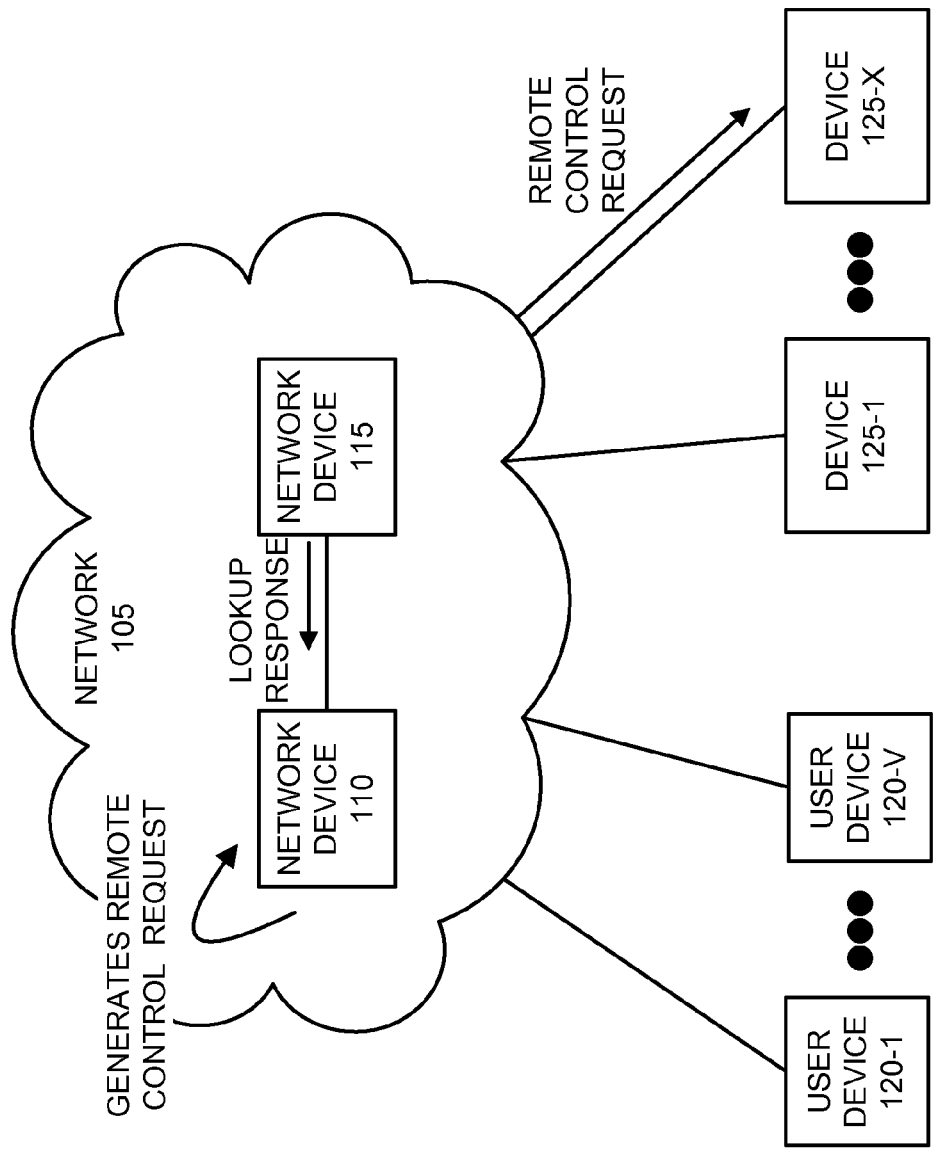

In response to selecting the expression, network device 115 performs a hashing process and generates one or multiple hashed strings. Referring to FIG. 2C, network device 115 generates a lookup response. The lookup response includes the one or multiple hashed values. As previously described, network device 115 may or may not truncate a hashed string. Network device 115 transmits the lookup response to network device 110.

Figure 6:
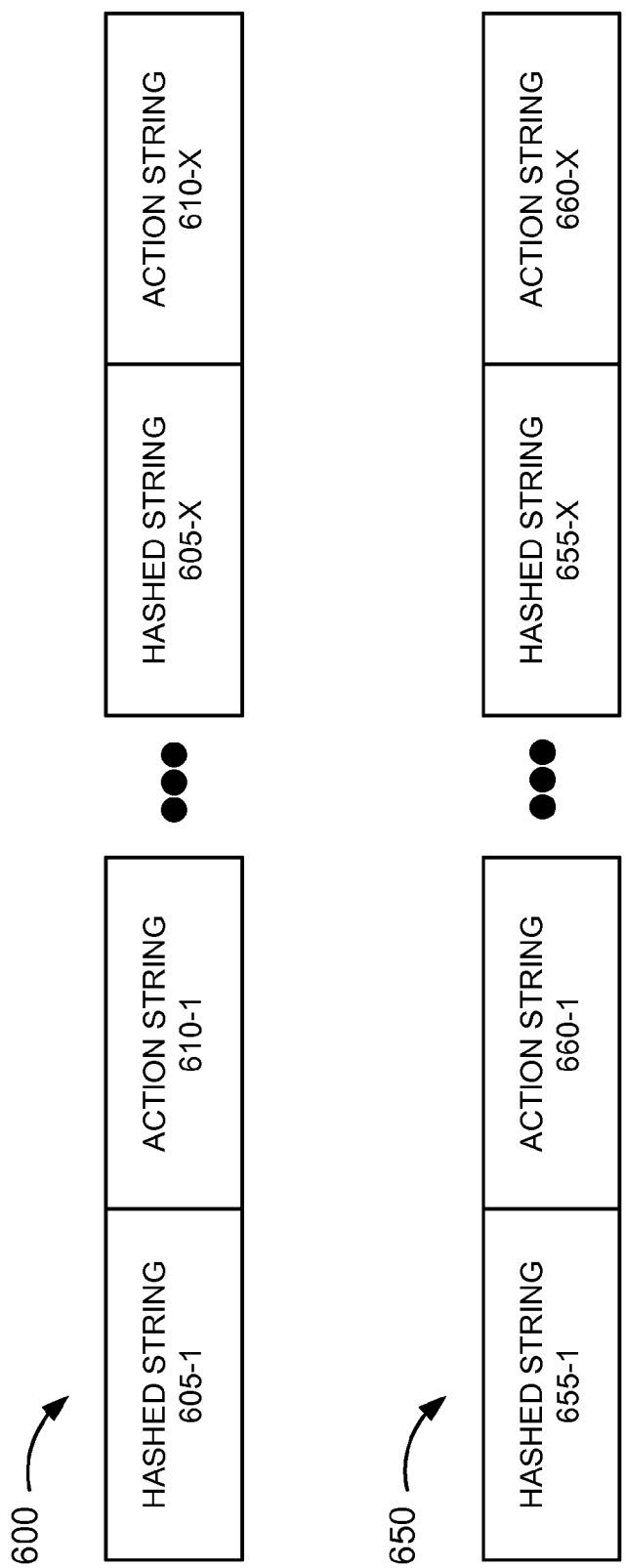
FIG. 6 is a diagram illustrating exemplary data or information included in a packet.

Referring to FIG. 2C, in response to receiving the lookup response, network device 110 generates a remote control request. The remote control request includes the hashed value(s). Additionally, the remote control request may include the action string included in the lookup request; the action string and the role string, or the substitute strings. For example, as illustrated in FIG. 6, a packet 600 may include a hashed string 605-1 and an action string 610-1. Alternatively, a packet 650 may include a hashed string 655-1 (e.g., for a role) and an action string 660-1. For example, a hashed string based on a specified role may be followed by one or multiple action strings permitted to a given role. This framework may reduce the volume of data that is transmitted, reduce the demand on computing resources, and reduce the time required for processing. As further illustrated, packet 600 and packet 650 may include a sequence or series of hashed values and action or role strings (e.g., hashed string 605-X, action string 610-X, hashed string 655-X, role string 660-X, in which X>1). According to other implementations, the remote control request may also include a vehicle string. The term "packet," as used herein, is intended to be broadly interpreted to include a data transmission or communication, the packaging of which may correspond to, for example, a packet, a cell, a frame, a datagram, some other type of container or unit of data, and/or a fragment thereof.

Referring to FIG. 2C, network device 110 establishes a machine-to-machine communication link with device 125-X and transmits the remote control request to device 125-X. For example, the remote control request is transmitted to a vehicular communication system of the user's car. According to an exemplary embodiment, network device 110 transmits a hashed value for every action to be performed. According to this scenario, the action is to unlock the doors.

Figure 2D:
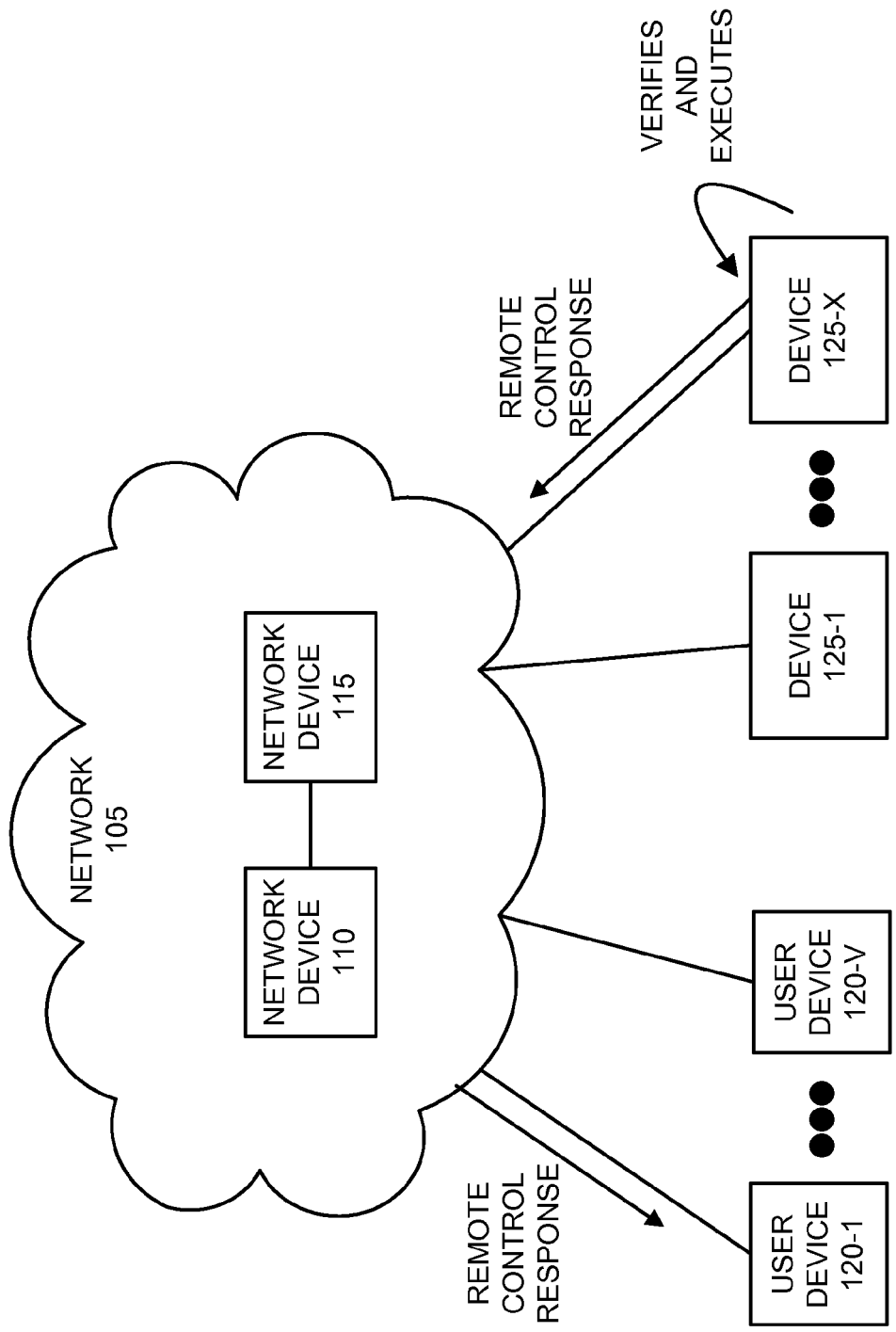

Referring to FIG. 2D, device 125-X verifies the remote control request. According to an exemplary embodiment, device 125-X selects a hashing expression and the action string and calculates hashed value(s). For example, device 125-X may use a string included in the remote control request and/or may store its own database or data structure to store secret strings. Device 125-X compares the calculated hashed value(s) to those included in the remote control response. If the hashed value(s) match, device 125-X performs the requested action (e.g., unlock doors). If the hashed value(s) do(es) not match, device 125-X may trigger an alarm, alert the user that an unsuccessful attempt to access or control the vehicle was made, automatically disconnect from further machine-to-machine communication, and/or transmit a message indicated a failed attempt to a trusted machine-to-machine service device.

According to another embodiment, device 125-X may verify one or more secret strings before performing a hashing process. For example, device 125-X may compare a role string received to those stored by device 125-X. If the role string is valid, device 125-X may proceed with a hashing process. Otherwise, if the role string is invalid, device 125-X may trigger an alarm, etc.

According to this scenario, it may be assumed that the remote control request is verified and device 125-X unlocks the door. Device 125-X transmits a remote control response indicating that the doors are unlocked to network device 110. A remote control response is sent to the user via user device 120-1.

Figure 4:
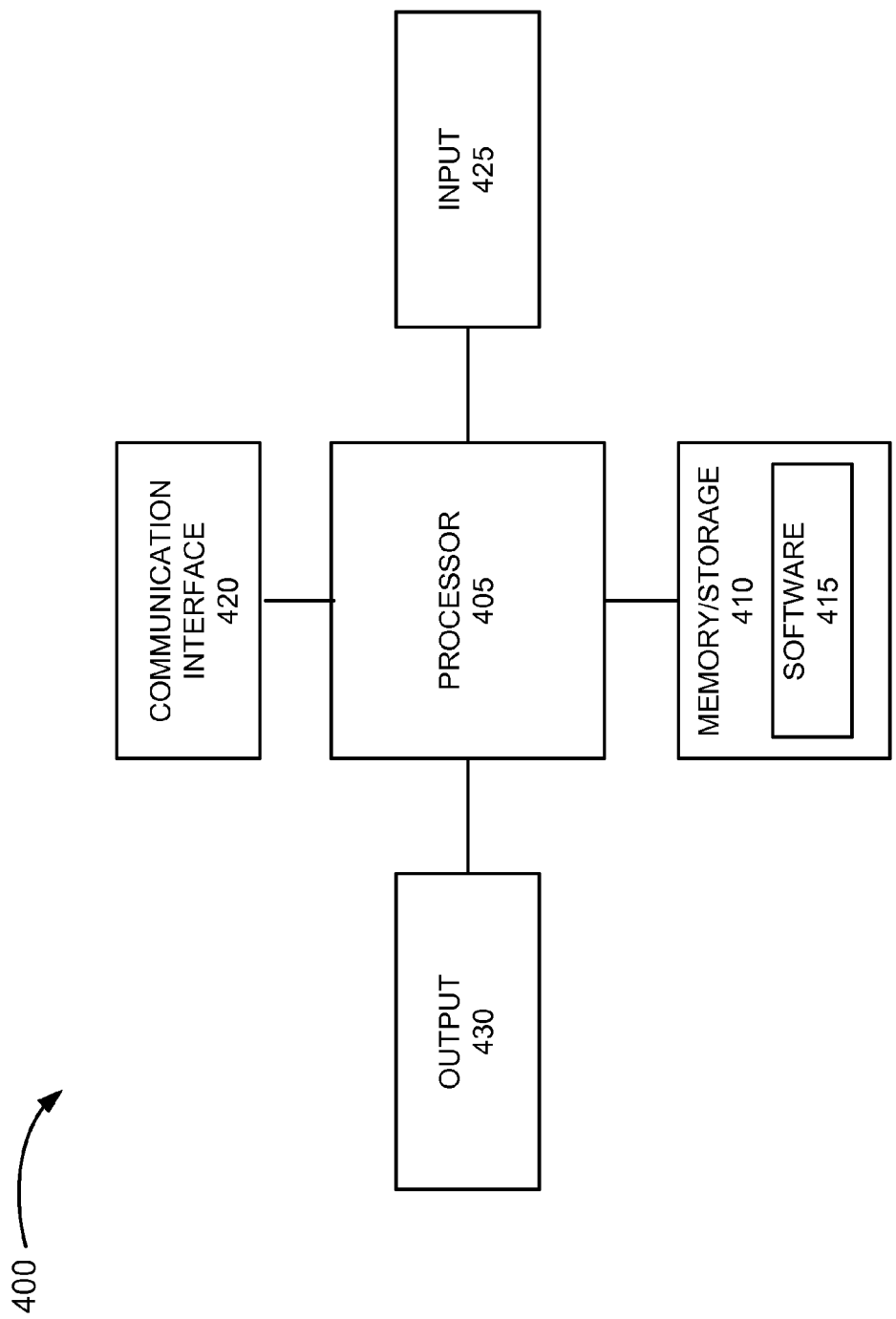
FIG. 4 is a diagram illustrating exemplary components of a device that may correspond to one or more of the devices in the environment depicted in FIG. 1.

FIG. 4 is a diagram illustrating exemplary components of a device 400 that may correspond to one or more of the devices in environment 100. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5:
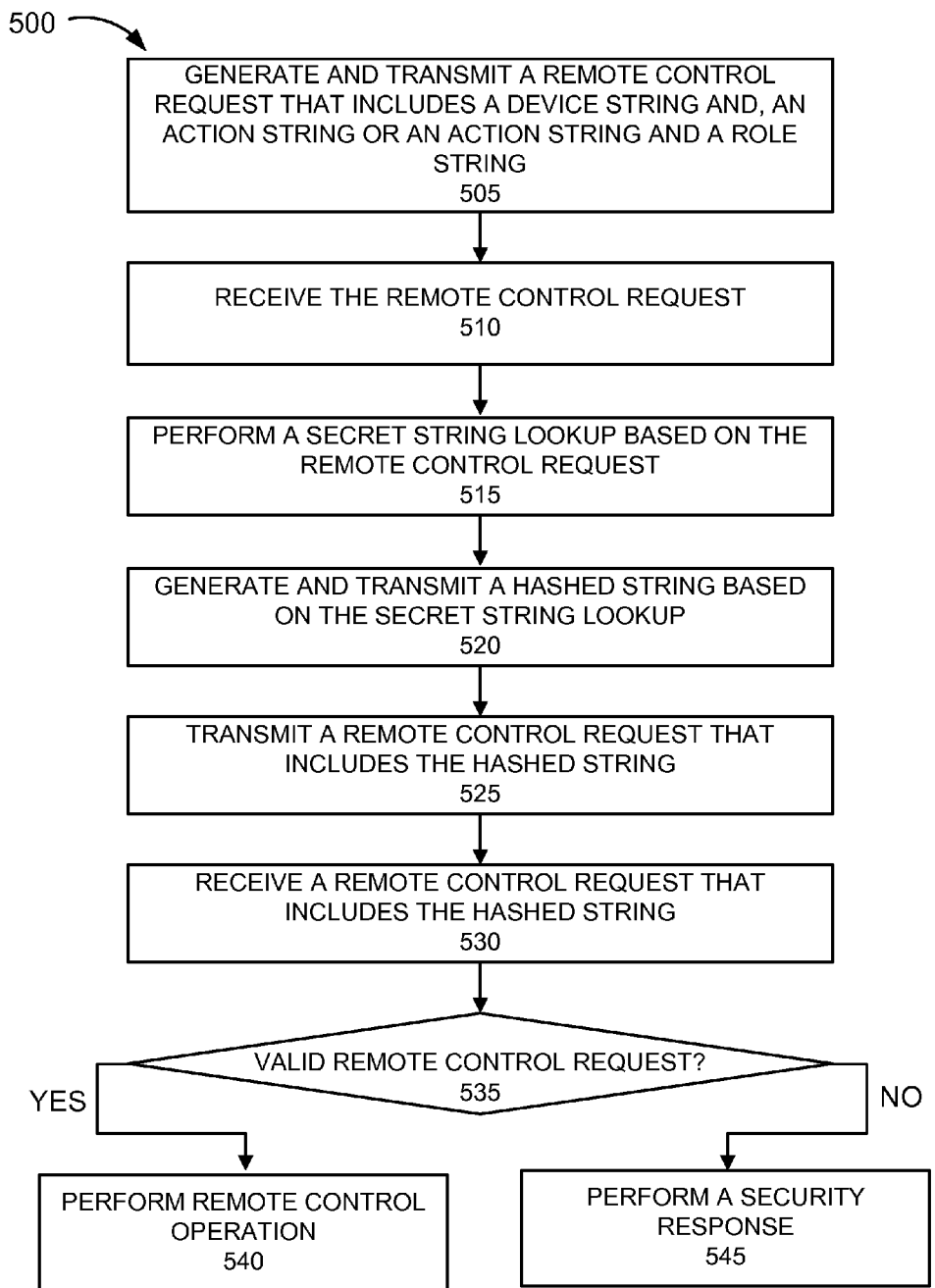
FIG. 5 is a flow diagram illustrating an exemplary process for remotely controlling a device.

FIG. 5 is a flow diagram illustrating an exemplary process 500 for remotely controlling a device. According to an exemplary embodiment, network device 110, network device 115, user device 120, and device 125 perform one or more steps of process 500. For example, processor 405 may execute software 415 to perform a step described. According to another embodiment of process 500, network device 110 and network device 115 may be combined into a single device in which process 500 may be modified. Additionally, or alternatively, according to an exemplary embodiment, user device 120 and device 120 may be combined into a single device in which process 500 may be modified.

Referring to FIG. 5, in block 505, a remote control request that includes a device string and, an action string or an action string and a role string is generated and transmitted. For example, user device 120 generates a remote control request that includes a vehicle string and an action string (e.g., indicating to disable the vehicle). Additionally, for example, the remote control request may include a role string (e.g., indicating a vehicle driver). User device 120 transmits the remote control request to the machine-to-machine system described herein.

In block 510, the remote control request is received. For example, network device 110 receives the remote control request.

In block 515, a secret string lookup based on the remote control request is performed. For example, network device 110 generates a lookup request based on the remote control request. As previously described, the lookup request may include a vehicle string and an action string. Alternatively, the lookup request may include a vehicle string, an action string, and a role string. Network device 110 transmits the lookup request to network device 115. In response to receiving the lookup request, network device 115 performs a lookup and hashing process. As previously described, network device 115 selects an entry from a database or a data structure that matches or correlates to the vehicle string and the action string. Additionally, or alternatively, network device 115 may select an entry based on the role string.

In block 520, a hashed string is generated based on the secret string lookup. For example, network device 115 generates one or multiple hashed strings based on an exemplary expression, previously described. Network device 115 transmits a lookup response that includes the hashed string to network device 110.

In block 525, a remote control request that includes the hashed string is transmitted. For example, network device 115 transmits a remote control request that includes the hashed string to device 125. Additionally, as previously described, the remote control request may also include an action string, a role string, a vehicle string, a combination thereof, etc.

In block 530, it is determined whether the remote control request is valid. For example, in response to receiving the remote control request, device 125 determines whether the remote control request is valid. For example, as previously described, device 125 selects a hashing expression. Device 125 calculates a hashed string and compares the hashed string to the hashed string included in the remote control request. Additionally, as previously described, device 125 may verify one or multiple secret strings (e.g., an action string, a role string, etc.).

If it is determined that the remote control request is valid (block 535—YES), then a remote control operation is performed (block 540). For example, device 125 performs the remote control action (e.g., disables the vehicle).

If it is determined that the remote control request is not valid (block 535—NO), then a secure response is performed (block 545). For example, device 125 may trigger an alarm, alert the user, etc., as previously described.

Although FIG. 5 illustrates an exemplary process 500 to remotely control a device via a machine-to-machine communication, according to other embodiments, process 500 may include additional operations, fewer operations, and/or different operations than those illustrated in FIG. 5 and described herein.

Although process 500 is described in relation to a vehicle as a device of the machine-to-machine communication, according to other embodiments, the device may be any other device applicable to machine-to-machine communication. As such, an action invoked by the receipt of a remote control request may cause the device to perform an operation, a process, etc., that would be applicable to such a device. Furthermore, the use of a secret string, such as an action string, a role string, a combination thereof, a master string, etc., may indicate an action, a role, etc., applicable to the devices and/or users involved in the machine-to-machine communication.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

The invention claimed is:

1. A method comprising:
receiving, by a network device, a request to invoke a machine-to-machine communication to permit remote control of a vehicle, wherein the request includes a vehicle string that identifies the vehicle and one or more secret strings, wherein the one or more secret strings include a role string that indicates a role of a user invoking an action to be remotely performed by the vehicle;
generating, by the network device, one or more hashed strings based on the request and a current time; and
transmitting, by the network device, a remote control request to the vehicle, wherein the remote control request includes the one or more hashed strings.

2. The method of claim 1, wherein the one or more secret strings include an action string that indicates the action to be remotely performed by the vehicle.

3. The method of claim 1, wherein the role of the user includes one of a service representative or a customer of a machine-to-machine communication service.

4. The method of claim 1, wherein the one or more secret strings include a master string that indicates a master role of the user with permissions to invoke actions equivalent to permissions associated with multiple roles.

5. The method of claim 1, wherein the generating comprises:
storing secret strings in a database;
performing a secret string lookup in the database in response to receiving the request;
selecting a hashing algorithm, wherein the hashing algorithm uses at least one of the one or more secret strings as arguments to calculate the one or more hashed strings;
identifying a current time; and
generating the one or more hashed strings based on the secret string lookup, the selected hashing algorithm, and the current time.

6. The method of claim 1, further comprising:
receiving the remote control request;
determining whether the remote control request is valid;
performing one or more actions in response to a determination that the remote control request is valid.

7. The method of claim 6, further comprising:
storing, by a vehicle communication system of the vehicle, secret strings; and
verifying one or more secret strings included in the remote control request based on the stored secret strings.

8. A network device comprising:
a communication interface;
one or more memories that store instructions; and
one or more processors to execute the instructions to:
receive, via the communication interface, a request to invoke a machine-to-machine communication to permit remote control of a vehicle, wherein the request includes a vehicle string that identifies the vehicle and one or more secret strings, wherein the one or more secret strings include a role string that indicates a role of a user invoking an action to be remotely performed by the vehicle;
generate one or more hashed strings based on the vehicle string, the one or more secret strings, and a current time; and
transmit a remote control request to the vehicle, wherein the remote control request includes the one or more hashed strings.

9. The network device of claim 8, wherein the one or more secret strings include an action string that indicates the action to be remotely performed by the vehicle.

10. The network device of claim 8, wherein the role of the user includes one of a service representative or a customer of a machine-to-machine communication service.

11. The network device of claim 8, wherein the one or more secret strings include a master string that indicates a master role of the user with permissions to invoke actions equivalent to permissions associated with multiple roles.

12. The network device of claim 8, further comprising:
a database that stores secret strings, and wherein the one or more processors further execute the instructions to:
perform a secret string lookup in the database in response to receiving the request;
select a hashing algorithm, wherein the hashing algorithm uses at least one of the one or more secret strings as arguments to calculate the one or more hashed strings;
identify the current time; and
generate the one or more hashed strings based on the secret string lookup, the selected hashing algorithm, and the current time.

13. The network device of claim 12, further comprising:
a memory to store multiple hashing algorithms, in which at least one of the hashing algorithms uses the one or more secret strings that include an action string that indicate the action to be remotely performed by the vehicle, the role string that indicates the role of the user invoking the action to be remotely performed by the vehicle, and the vehicle string.

14. The network device of claim 8, wherein the one or more processors further execute the instructions to:
truncate the one or more hashed strings to a predetermined number of bits.

15. The network device of claim 8, wherein the remote control request includes the one or more secret strings.

16. A non-transitory storage medium storing instructions executable by a computational device to:
receive a request to invoke a machine-to-machine communication to permit remote control of a device, wherein the request includes a device string that identifies the device and one or more secret strings, wherein the one or more secret strings include a role string that indicates a role of a user invoking an action to be remotely performed by the device;
generate one or more hashed strings based on the one or more secret strings, the device string, and a current time; and
generate a remote control request that includes the one or more hashed strings.

17. The non-transitory storage medium of claim 16, wherein the one or more secret strings include an action string that indicates the action to be remotely performed by the device.

18. The non-transitory storage medium of claim 16, wherein the role of the user includes one of a service representative, a customer, or an administrator of a machine-to-machine communication service.

19. The non-transitory storage medium of claim 16, further storing instructions executable by the computational device to:
perform a secret string lookup in response to receiving the request; and compare one or more entries associated with the secret string lookup to the one or more secret strings.

20. A method comprising:

receiving, by a network device, a request to invoke a machine-to-machine communication to permit remote control of a device, wherein the request includes a device string that identifies the device and secret strings, wherein the secret strings include an action string that indicates an action to be remotely performed by the device and a role string that indicates a role of a user invoking the action to be remotely performed by the device;

generating, by the network device, one or more hashed strings based on the device string, the secret strings, and a current time; and transmitting, by the network device, a remote control request to the device, wherein the remote control request includes the one or more hashed strings and the secret strings.

21. The method of claim 20, wherein the device includes a vehicle and the role includes one of a driver of the vehicle or an owner of the vehicle.

* * * * *